Feb. 17, 1931.  W. H. CAMPBELL  1,792,813
METHOD OF AND APPARATUS FOR MANUFACTURING HOLLOW RESILIENT ARTICLES
Filed March 29, 1929  2 Sheets-Sheet 2

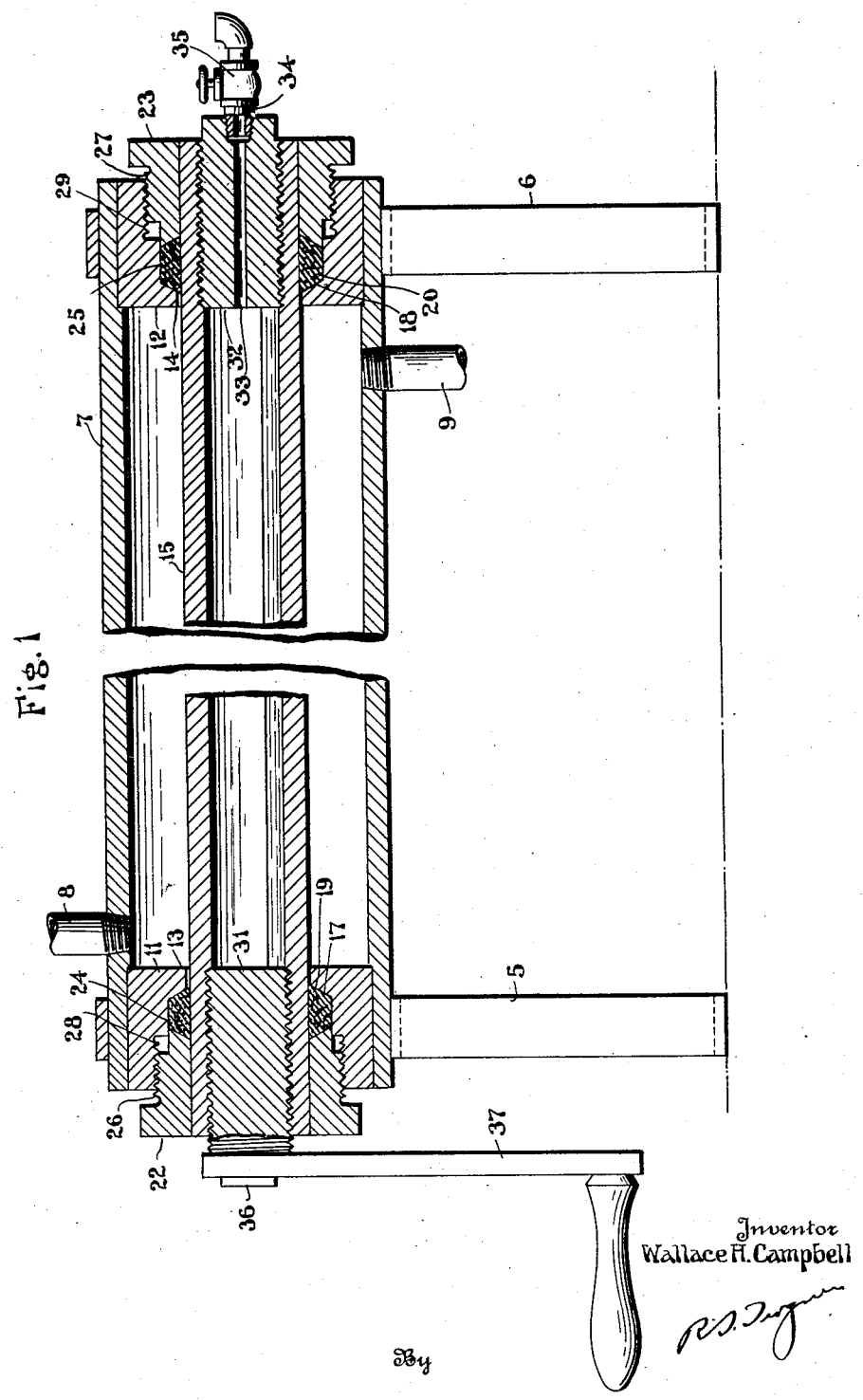

Inventor
Wallace H. Campbell

By

Attorney

Patented Feb. 17, 1931

1,792,813

UNITED STATES PATENT OFFICE

WALLACE H. CAMPBELL, OF AKRON, OHIO, ASSIGNOR TO THE GOODYEAR TIRE & RUBBER COMPANY, OF AKRON, OHIO, A CORPORATION OF OHIO

METHOD OF AND APPARATUS FOR MANUFACTURING HOLLOW RESILIENT ARTICLES

Application filed March 29, 1929. Serial No. 350,961.

This invention relates to the manufacture of resilient articles from latex, and it has particular relation to a method of and apparatus for building up articles by the coagulation of films of latex directly upon a suitable form.

One object of the invention is to obviate certain of the intermediate steps heretofore employed in the manufacture of rubber articles.

Another object of the invention is to provide a method of manufacturing articles of the above designated character in which substantially all of the natural antioxidants and accelerators present in latex are retained in the finished product.

An additional object of the invention is to provide a novel form of apparatus for practicing the above described method.

Heretofore, in the manufacture of articles such as inner tubes composed of rubber compound, it has been customary first to remove the rubber from the liquid phase of the latex either by coagulation of the rubber or by evaporation of the liquids. The solid material thus obtained was then washed in order to remove impurities, after which it was milled upon suitable rollers in order to plasticize it and to introduce therein the requisite fillers and other compounding ingredients. Finally, the compound prepared in this manner was pressed by rollers into sheets and formed into articles by convenient methods.

It will be apparent that this process involved a great many intermediate steps in the transformation of the rubber of latex into the finished products. Furthermore, it has been found that when latex is coagulated in the usual manner, the solid rubber obtained therefrom is deprived of certain constituents which enhance its aging characteristics and which also accelerate the rate of vulcanization thereof.

This invention consists in the provision of a method of manufacturing rubber articles, in which the surface of a suitable form is rotated in a bath of latex. At the same time, heat is applied to the surface, thus effecting coagulation of a film of latex directly upon it. If desired, the application of heat may be continued until the rubber compound is completely vulcanized, thereby obviating the various intermediate steps of coagulating the latex and subsequently milling the rubber obtained with compounding ingredients.

For a better understanding of the invention, reference may now be had to the accompanying drawing forming a part of the specification, in which;

Figure 1 is a cross-sectional view of one embodiment of the apparatus suitable for the manufacture of such tubular articles as inner tubes for pneumatic tires;

Figure 3:
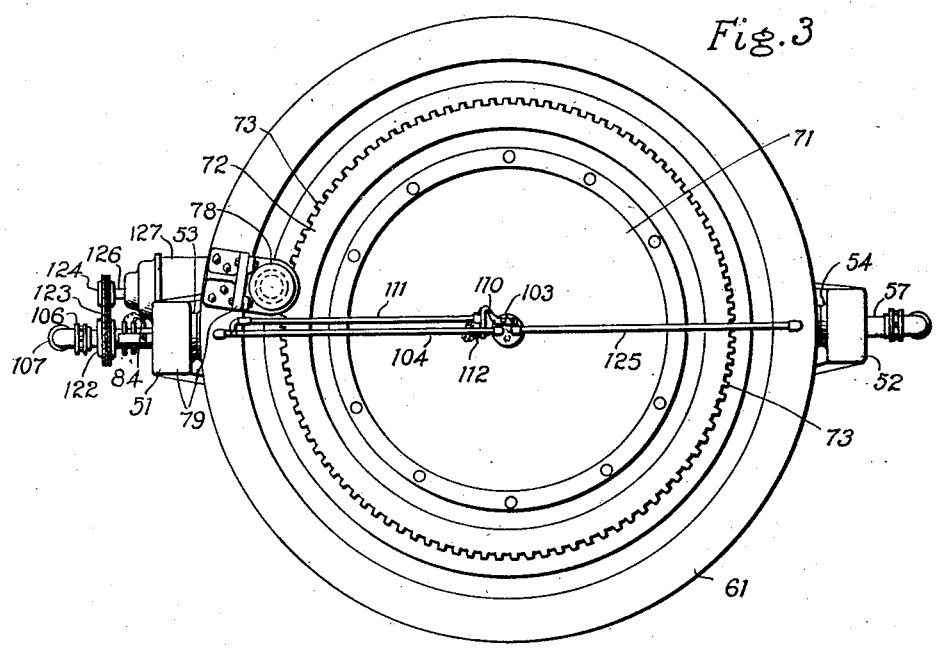
Figure 3 is a plan view of the apparatus disclosed in Figure 2.

In the embodiment of the invention disclosed in Figure 1, upright members 5 and 6 are provided for supporting the ends of an outer jacket or fluid retaining member 7. A flow of heated fluid, such as steam or hot water, is maintained in the latter by means of an inlet conduit 8 and an outlet conduit 9, which are screw-threaded into the walls of the jacket adjacent the opposite ends thereof. The ends of the jacket 7 are closed by means of plugs 11 and 12, which have central openings 13 and 14 formed therein for the reception of a revolving central tube or mandrel 15. In order to prevent the escape of heated fluid through any interstices or openings between the walls of the tube 15 and the inner peripheries of the plugs 11 and 12, the latter members are formed with offset portions 17 and 18 in which are secured resilient packing rings 19 and 20. Outward displacement of the rings within the openings is prevented by means of collars 22 and 23, which have inwardly beveled shoulder portions 24 and 25 that bear against the sides of the rings 19 and 20. The collars in turn are retained in position within the plugs 11 and 12 by engagement of screw threads 26 and 27 with corresponding threads 28 and 29, formed adjacent the outer ends of the plugs.

In order to retain latex within the cylinder or mandrel 15, the ends of the latter are closed by means of plugs 31 and 32. Latex is admitted to the interior of the mandrel through a longitudinally extending passageway 33 formed in the plug 32, which communicates with a tube 34 screw-threaded therein and having a valve 35 whereby ingress of latex to and egress of steam from the cylinder 15 may be controlled.

The cylinder or tube 15 may be rotated by any convenient means, but for purposes of illustration, the plug 31 is shown as having a shoulder 36 formed upon the outer end thereof, and a manually operated crank 37 is rigidly secured thereto.

In the operation of the mechanism, latex containing the requisite compound ingredients, such as pigments, sulphur and accelerators, is injected into the tube 15 through the conduit 34. The valve 35 is then operated to close the conduit and thus retain the latex within the cylinder. A flow of heated fluid, such as water or steam, is then initiated through the conduits 8 and 9, in order to coagulate the latex and to vulcanize the rubber contained therein. During this heat operation, the tube 15 is constantly rotated by means of the handle 37, thereby effecting uniform deposition of the rubber upon the interior surface of the tube. If desired, upon completion of the deposition of rubber, the heating operation may be discontinued and one of the plugs 31 or 32 removed from the cylinder 15 in order to permit removal of the newly formed article. However, it is preferable to leave the article in the tube and to continue the heating operation until it is completely vulcanized.

Figure 2:
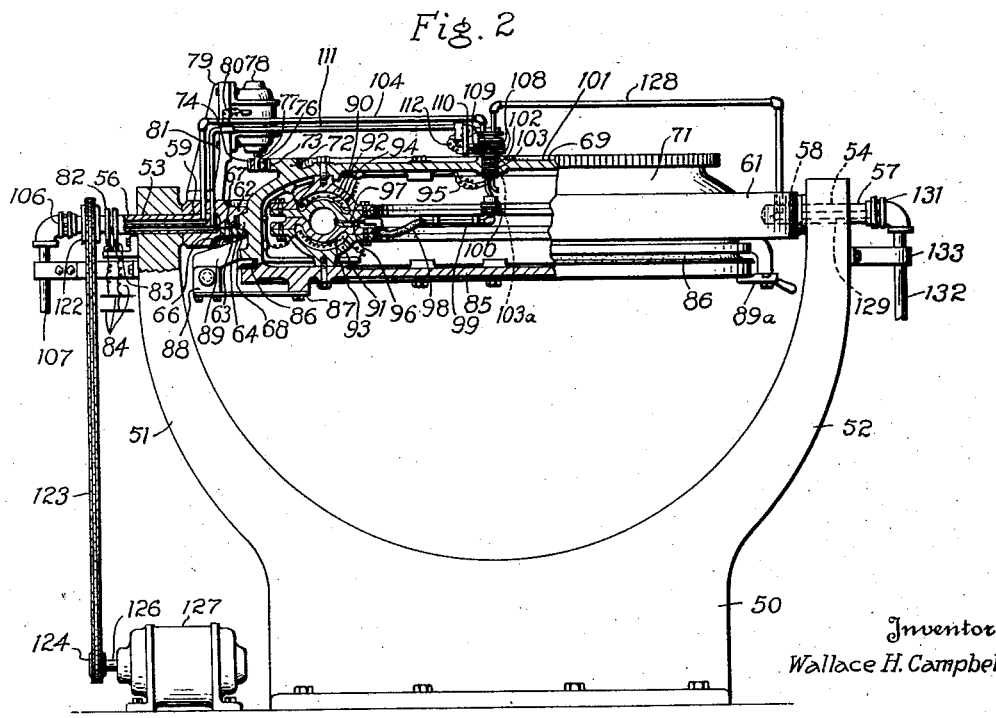
Figure 2 is a view partially in cross-section and partially in elevation of another form of apparatus which is adapted for the manufacture of full molded tubes.

In the form of the invention disclosed in Figures 2 and 3, a base or pedestal 50 is provided upon its upper end with outwardly diverging curved arms 51 and 52, which are formed with bearing portions 53 and 54 at the extremities thereof. These portions rotatably receive horizontal hollow trunnions 56 and 57, which are rigidly secured at their inner extremities within sockets 58 and 59 formed in an annular member 61. As best shown in Figure 2, the latter has a circumferentially extending flange 62 formed about its inner periphery, which forms one side wall of a peripherally extending groove 63. The other side wall of the groove is formed by an annulus 64 which is detachably retained in a peripherally extending recess 66 in the ring 61 by means of screws 67. The groove 63 functions as a bearing for an outwardly projecting circumferential flange 68 formed upon one portion 69 of a so-called watch-case housing or mold container 71. In order to impart rotational movement to the housing 71 in the plane of the ring 61, the portion 69 is provided adjacent the upper portion thereof with an outwardly projecting peripherally extending flange 72 having gear teeth 73 formed thereon, that mesh with corresponding teeth 74 upon a driven pinion 76. The latter is keyed to a drive shaft 77 of a motor 78 which is rigidly secured to a bracket 79 that is secured perpendicularly to the ring 61.

Energizing current is supplied to the motor by means of conductors 80 which are housed within a conduit 81 that is secured to the trunnion 56. The conductors extend outwardly through the trunnion and are attached at their extremities to slip rings 82 which are mounted upon the trunnion and which contact with brushes 83 at the extremities of supply lines 84.

As best shown in Figure 2, the portion 69 of the watch-case housing 71 is closed by means of a lid 85 which is provided with a flexible gasket 86 adjacent the outer periphery thereof, in order to form a fluid-tight seal between it and the adjacent edge of the member 69. The lid is hinged to the container 69 by means of a semi-flexible strap 87 that is bolted to a block 88. The latter, in turn, is pivoted to an outwardly projecting bracket 89 upon the side of the member 69. The lid may be locked in closed position upon the member 69 by means of a latch 89a. Upper and lower annular mold sections 90 and 91 of concave cross-sectional contour are respectively bolted to the watch-case portion 69 and the lid 85. As best shown in Figure 2, the mold sections are formed with peripherally extending chambers 92 and 93, in which are housed electric heating coils 94, attached to electrical conductors 95.

The mold section 90 is provided at the inner periphery thereof with a radially extending opening 96, in which a valve stem 97 is secured. The latter, in turn, is secured to a flexible portion 98 of a conduit 99, through which compounded latex and compression fluid is admitted to the mold and which is provided at its inner extremity with a swivel joint 100. In order to permit egress of connecting lines 95 and the conduit 99 from the member 69, the upper portion 101 of the member is formed with a centrally located opening 102, in which is rigidly secured a tubular member 103, through which both the wiring and the conduit extend. A suitable packing plug 103a may be rotatably secured within the opening in order to prevent the passage of fluid through this member.

The joint 100 is attached to a supply conduit 104 which extends outwardly through the hollow trunnion 56 and communicates at its outer end through a swivel joint 106 with a stationary conduit 107, through which latex and compressed fluid may be injected into the molds.

The electric conductors 95 are connected exteriorly of the watch-case portion 69 to slip rings 108 upon the member 103 which contact with brushes 109 mounted upon a bracket 110. The inner end of a conduit 111 that forms a continuation of the conduit 81 serves as a support for the bracket 110. The brushes 109 are connected to wires 112 which are housed within the conduit and which are attached to conductors 80.

In order to impart rotational motion to the ring 61 and the housing 71, the trunnion 56 is provided adjacent its outer extremity with a sprocket gear 122, about which is trained a sprocket chain 123. The latter is further trained about a second sprocket gear 124, which is keyed to the shaft 126 of a motor 127.

In order to facilitate the operation of closing and securing the lid 85 in position upon the watch-case section 69, a conduit 128 is extended inwardly through the tubular member 103. The conduit 128 in turn communicates with a passage 129, which extends through the trunnion 57 to a swivel connection 131 formed upon the outer extremity of the trunnion. The latter is connected with a conduit 132 that leads to a suitable source of vacuum (not shown). A rigid connection is provided between the conduit 132 and the branch 52 by means of a supporting bracket 133 upon the latter.

In the operation of the apparatus, the lid 85 is first closed upon the watch-case section 69, in order to bring the mold sections 90 and 91 into registering relation. Air is exhausted through the conduit 132 from the interior of the chamber formed by the portion 69 and the lid, in order securely to hold the mold sections in that relation. A quantity of latex is injected through the valve 97 and the conduit 99 into the mold chamber, after which a compressed fluid (preferably steam under pressure) is admitted to the chamber through the same passageway.

By energizing the motor 78, the section 69 is rotated within the ring 61, and the heating coils 93 are also energized. At the same time, the motor 127 is energized in order to rotate the ring 61, and the section 69 in a plane at right angles to the plane of rotation caused by the motor 78 as viewed in Figure 2. It will be observed that, by this compound rotation of the mold in a plane perpendicular to its central axis and also in a plane perpendicular to its own plane, uniform distribution of the latex about the interior surface of the mold is insured.

The heating of the mold by the coils 93 causes coagulation of the latex upon the inner surface of the mold. This coagulation continues until substantially all of the rubber contained in the latex, together with the pigments suspended therein, is deposited as a uniform film about the inner surface of the mold. At the same time, the liquid phase of the latex separates and collects within the interior of the article formed. If desired, this liquid may be blown out through the valve 97 upon the completion of the coagulation of the latex. However, it is preferable to leave it within the freshly formed pneumatic tube, and to continue the application of heat by means of the coils 93 until the tube is completely vulcanized.

After that operation is completed, the tube may be removed from the mold by admitting air into the vacuum chamber 69 and opening the lid 85. The tube when removed from the casing is in substantially completed form, the only operation remaining to be performed being merely the screwing of a clamping nut upon the valve stem 97.

By employing this apparatus, many of the steps ordinarily employed in the manufacture of pneumatic tubes are eliminated. For example, it is entirely unnecessary to mill the coagulated rubber. Also, the usual steps of cementing and splicing the ends of the cured tubes are unnecessary.

Although I have illustrated only the preferred forms which the invention may assume, it will be apparent to those skilled in the art that the invention is not so limited, but that various modifications may be made therein without departing from the spirit of the invention or from the scope of the appended claims.

What I claim is:

1. A method of forming rubber articles which comprises subjecting latex containing the requisite vulcanizing ingredients to heat and pressure within a rotating closed container, in order to effect deposition of the rubber contained in the latter as a uniform coating film upon the interior of the container.

2. A method of forming rubber articles which comprises subjecting latex containing the requisite vulcanizing ingredients to heat and pressure within a rotating closed container, in order to effect deposition of the rubber contained in the latter as a uniform coating film upon the interior of the container, and continuing the application of heat until the rubber is completely vulcanized.

3. A method of forming annular tubes of rubber which comprises injecting a quantity of latex within an annular mold, rotating the mold about its axis and at the same time coagulating the latex as a film upon the interior surface of the mold.

4. A method of forming hollow annular rubber articles which comprises injecting a quantity of latex within an annular mold, rotating the mold simultaneously in a plane perpendicular to the axis thereof and also in a plane perpendicular to the plane of the first mentioned rotation, and at the same time coagulating the rubber as a uniform film upon the interior surface of the mold.

5. A method of forming hollow annular rubber articles which comprises injecting a quantity of latex within an annular mold, rotating the mold about the axis thereof, and simultaneously applying heat thereto in order to cause deposition of the rubber in the latex upon the interior surface of the mold.

6. A method of forming hollow annular rubber articles which comprises injecting a quantity of latex within an annular mold, simultaneously rotating the mold about an axis perpendicular to the plane thereof and about an axis perpendicular to the first mentioned axis, and at the same time applying heat to the mold in order to cause deposition of the rubber upon the interior surface of the mold.

7. An apparatus for manufacturing annular pneumatic tubes comprising an annular mold, means to rotate the mold in a plane perpendicular to its central axis, and means simultaneously to rotate it in a plane perpendicular to the first mentioned plane.

8. An apparatus for manufacturing annular pneumatic tubes comprising an annular mold, means to rotate the mold in a plane perpendicular to the axis thereof, additional means to rotate it in a plane perpendicular to the first mentioned plane, and means to heat the mold.

9. An apparatus for manufacturing pneumatic tubes comprising a support, a ring mounted upon bearings lying within its own plane and journalled upon the support, an annular mold mounted within the inner periphery of the ring, means to rotate the mold in the plane of the ring, and means to rotate the ring upon its bearings.

10. An apparatus for manufacturing annular pneumatic tubes comprising a ring mounted upon radially extending bearings, a groove formed about the inner periphery of the ring, an annular mold having a flange secured within the groove, means to rotate the mold within the ring, and means to rotate the ring upon its own bearings.

11. An apparatus for manufacturing annular pneumatic tubes comprising a ring journalled upon radially extending hollow trunnions, an annular mold mounted within the ring and having means for rotating it within the plane of said ring, means connecting the mold with a source of fluid under pressure, and means for heating the mold.

In witness whereof, I have hereunto signed my name.

Signed at Akron, in the county of Summit and State of Ohio, U. S. A., this 28th day of March, 1929.

WALLACE H. CAMPBELL.